US012665974B2

(12) United States Patent
Mochizuki

(10) Patent No.: US 12,665,974 B2
(45) Date of Patent: Jun. 23, 2026

(54) APPARATUS, METHOD, AND PROGRAM FOR SYNCHRONIZING MULTI-FUNCTION PERIPHERAL AND VIRTUAL CLOUD DEVICE

(71) Applicant: FUJIFILM Business Innovation Corp., Tokyo (JP)

(72) Inventor: Akiko Mochizuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/177,176

(22) Filed: Mar. 2, 2023

(65) Prior Publication Data

US 2024/0073338 A1 Feb. 29, 2024

(30) Foreign Application Priority Data

Aug. 29, 2022 (JP) ................................. 2022-135576

(51) Int. Cl.
*H04N 1/00* (2006.01)
(52) U.S. Cl.
CPC ..... *H04N 1/00933* (2013.01); *H04N 1/00896* (2013.01); *H04N 1/00973* (2013.01); *H04N 1/00204* (2013.01)
(58) Field of Classification Search
CPC ........... H04N 1/00933; H04N 1/00896; H04N 1/00973; H04N 1/00204
See application file for complete search history.

(56) References Cited

U.S. PATENT DOCUMENTS

| | | | | |
|---|---|---|---|---|
| 2014/0376028 A1* | 12/2014 | Tsujita | ................. | G06K 15/406 |
| | | | | 358/1.14 |
| 2016/0036631 A1* | 2/2016 | Shibata | ................... | G06F 11/00 |
| | | | | 709/221 |
| 2017/0041488 A1* | 2/2017 | Shibata | .............. | H04N 1/32101 |
| 2017/0357471 A1* | 12/2017 | Hosono | ................. | G06F 3/1229 |
| 2019/0056899 A1* | 2/2019 | Fukuoka | ........... | H04N 1/00915 |
| 2019/0068818 A1* | 2/2019 | Yabe | ...................... | G06F 3/1232 |
| 2019/0215411 A1* | 7/2019 | Komaki | ............. | H04N 1/00244 |

FOREIGN PATENT DOCUMENTS

| | | |
|---|---|---|
| JP | 2016/082334 A | 5/2016 |
| JP | 2017-010321 A | 1/2017 |
| JP | 2019-144949 A | 8/2019 |

* cited by examiner

*Primary Examiner* — Nicholas Pachol
(74) *Attorney, Agent, or Firm* — Oliff PLC

(57) ABSTRACT

An information processing apparatus configured to synchronize held data with an other information processing apparatus includes a processor configured to: acquire a list of pieces of synchronization target data from the other information processing apparatus in response to return from a power saving state; control synchronization processes to execute a first synchronization process for synchronizing, among the pieces of synchronization target data, first data expected to affect execution of processes of one or more users and designated by the other information processing apparatus, and then execute a second synchronization process for synchronizing pieces of second data other than the first data; and in response to a request to execute a process before completion of execution of the synchronization processes, start to execute the requested process after completion of execution of the first synchronization process without waiting for completion of execution of the second synchronization process.

12 Claims, 6 Drawing Sheets

APPARATUS, METHOD, AND PROGRAM FOR SYNCHRONIZING MULTI-FUNCTION PERIPHERAL AND VIRTUAL CLOUD DEVICE

CROSS-REFERENCE TO RELATED APPLICATIONS

This application is based on and claims priority under 35 USC 119 from Japanese Patent Application No. 2022-135576 filed Aug. 29, 2022.

BACKGROUND

(i) Technical Field

The present disclosure relates to an information processing apparatus, a non-transitory computer readable medium storing a program, and an information processing method.

(ii) Related Art

There is known a technology for providing cloud services by causing a real multifunction peripheral to cooperate with a virtual cloud device corresponding to the multifunction peripheral. Users may use an image processing service or other services of the multifunction peripheral by accessing the virtual cloud device instead of directly accessing the multifunction peripheral.

In order that the virtual device may provide the same services as those of the multifunction peripheral, the multifunction peripheral and the virtual device are sequentially synchronized with each other to keep the same data or keep data in association. The synchronization is started in response to an update inquiry from the multifunction peripheral to the virtual device.

The multifunction peripheral in a power-off state or in a power saving mode is not synchronized with the virtual device. Therefore, the multifunction peripheral inquires update from the virtual device in response to return from the power saving state, and achieves synchronization by acquiring data updated while the synchronization is not performed.

Japanese Unexamined Patent Application Publication Nos. 2016-082334, 2019-144949, and 2017-010321 are examples of related art.

SUMMARY

Aspects of non-limiting embodiments of the present disclosure relate to the following circumstances. It is assumed that data is synchronized with another information processing apparatus at a timing of return from the power saving state. If the start of a requested process is attempted after all pieces of synchronization target data are collectively synchronized but, for example, the size of the pieces of synchronization target data is large, a long period is needed to complete the synchronization. As a result, the start of the process is delayed.

Aspects of non-limiting embodiments of the present disclosure therefore relate to suppression of a delay in the start of a requested process in a case where data is synchronized with another information processing apparatus at a timing of return from a power saving state, compared with a configuration in which the requested process is started after all pieces of synchronization target data are synchronized by a synchronization process.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus configured to synchronize held data with an other information processing apparatus, the information processing apparatus comprising a processor configured to: acquire a list of pieces of synchronization target data from the other information processing apparatus in response to return from a power saving state; control synchronization processes to execute a first synchronization process for synchronizing, among the pieces of synchronization target data, first data expected to affect execution of processes of one or more users and designated by the other information processing apparatus, and then execute a second synchronization process for synchronizing pieces of second data other than the first data; and in response to a request to execute a process before completion of execution of the synchronization processes, start to execute the requested process after completion of execution of the first synchronization process without waiting for completion of execution of the second synchronization process.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure are described with reference to the drawings.

First Exemplary Embodiment

Figure 1:
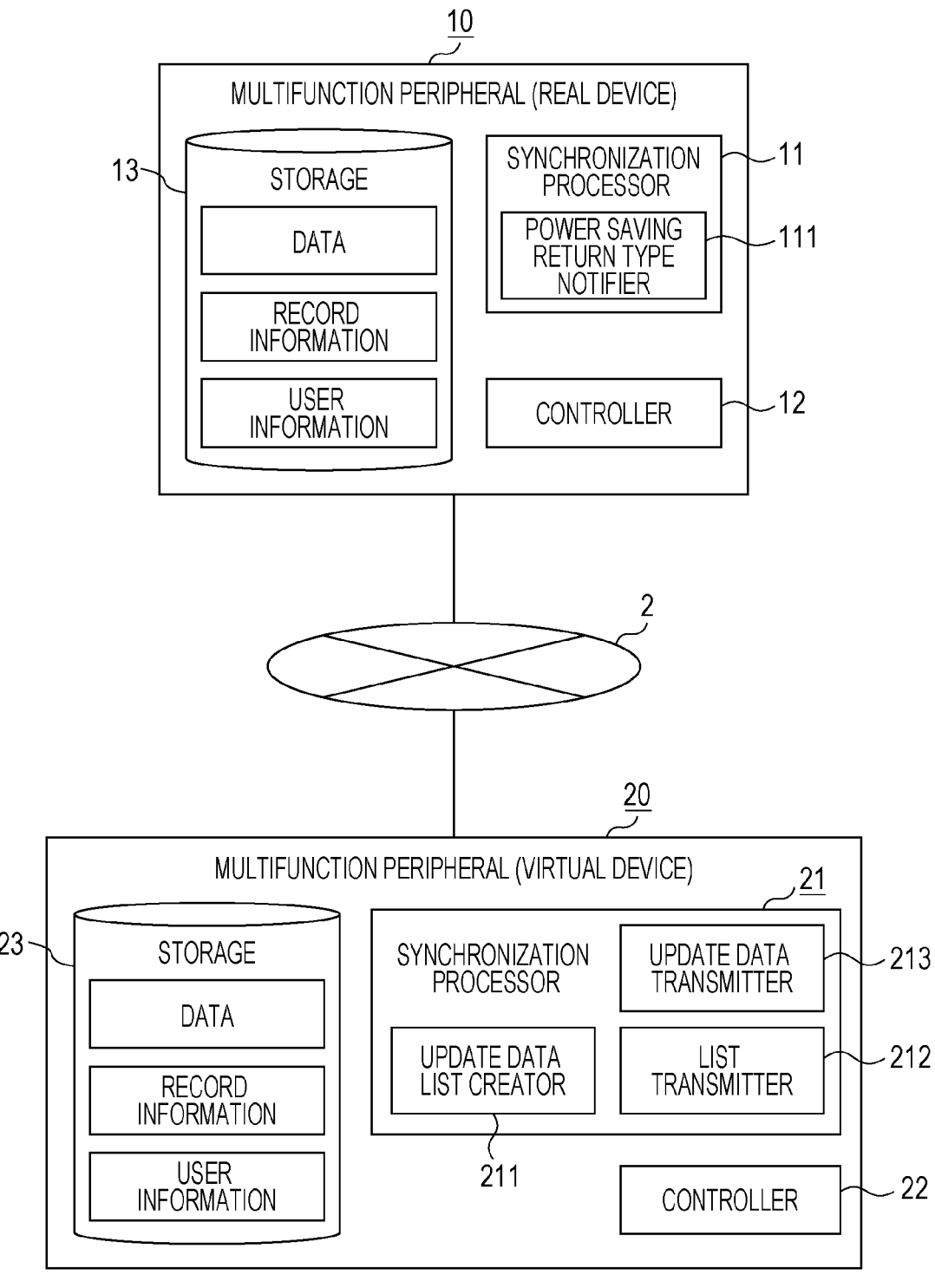
FIG. 1 illustrates an overall configuration of a service system and block configurations of devices in a first exemplary embodiment.

FIG. 1 illustrates an overall configuration of a service system and block configurations of devices in this exemplary embodiment. In FIG. 1, an on-premises multifunction peripheral 10 and a cloud multifunction peripheral 20 are connected via a network 2 such as the Internet. Since the multifunction peripheral 10 is a real multifunction peripheral physically installed on the premises, the multifunction peripheral 10 is hereinafter referred to also as "real device 10". Since the multifunction peripheral 20 is a virtual multifunction peripheral on the cloud, the multifunction peripheral 20 is hereinafter referred to also as "virtual device 20". In this exemplary embodiment, the real device 10 and the virtual device 20 are in a one-to-one relationship for convenience, but a plurality of real devices 10 may be associated with one virtual device 20.

In this exemplary embodiment, the multifunction peripheral 10 is one form of an image forming apparatus having various functions such as a printing function, a copying function, and a scanner function, and includes an information processing apparatus (referred to also as "computer"). In this exemplary embodiment, the multifunction peripheral 10 may be realized by an existing general-purpose hardware configuration. That is, the multifunction peripheral 10 includes a CPU, a ROM, a RAM, a storage such as a hard disk drive (HDD) that stores image data and a confidential mailbox, an operation panel serving as a user interface, a communicator that realizes short-range wireless communication between the network 2 such as the Internet and a user's IC card, and a scanner and a print engine that provide various functions.

The virtual device 20 is one form of a virtual image forming apparatus realized by one or more computers, and includes an information processing apparatus.

In order that the real device 10 and the virtual device 20 may provide substantially the same services for users, the real device 10 and the virtual device 20 perform data synchronization. The term "data synchronization" basically means that the same data is mutually held. A subset of software in the virtual device 20 may be present in the multifunction peripheral 10. Thus, the term "data synchronization" is not limited to the meaning that the pieces of mutually held data are completely identical to each other. In this exemplary embodiment, the term "data synchronization" means that the multifunction peripherals 10 and 20 cooperate with each other to provide services by using data.

The term "data" includes applications, data for use in the applications, and various setting values for the multifunction peripherals 10 and 20. That is, the term "data" in this exemplary embodiment collectively means electronic data to be referred to for operations of the multifunction peripherals 10 and 20. If the data is an application, synchronization may be need due to upgrade or addition of functions.

In FIG. 1, the real device 10 includes a synchronization processor 11, a controller 12, and a storage 13. FIG. 1 illustrates components to be described in this exemplary embodiment, and other components such as those for implementing the printing function of the multifunction peripheral 10 are omitted. The same applies to the multifunction peripheral 20.

The synchronization processor 11 performs a synchronization process for synchronizing data with the virtual device 20. The synchronization processor 11 includes a power saving return type notifier 111 that notifies, when the real device 10 has returned from a power saving state, the virtual device 20 about a power saving return type that has triggered the return from the power saving state. The controller 12 controls operations of the multifunction peripheral 10, such as display control on the operation panel and return from the power saving state.

The storage 13 stores various types of information including data, record information, and user information as illustrated in FIG. 1. The data is data to be synchronized with the virtual device 20. The record information is generated by accumulating records of use of the multifunction peripheral 10 by users. For example, the record information includes records of users' operations on the operation panel and job log information of jobs performed in response to users' requests. The user information is personal information of users of the multifunction peripheral 10. For example, the user information includes information for identifying applications registered in the real device 10 by users.

The components 11 and 12 of the real device 10 are realized by collaboration between the computer mounted on the real device 10 and programs that operate on the CPU mounted on the computer. The storage 13 is realized by the HDD mounted on the real device 10. Alternatively, a RAM may be used or an external storage may be used via the network.

Since the virtual device 20 is the virtual multifunction peripheral of the real device 10, the virtual device 20 basically has substantially the same functions as those of the real device 10. That is, the virtual device 20 includes a synchronization processor 21, a controller 22, and a storage 23 similarly to the real device 10. However, the functions are slightly different.

The synchronization processor 21 synchronizes data between the multifunction peripherals 10 and 20 in cooperation with the synchronization processor 11. The synchronization processor 21 includes an update data list creator 211, a list transmitter 212, and an update data transmitter 213 that operate when the real device 10 returns from the power saving state. The update data list creator 211 creates a list of pieces of data to be synchronized because update has been made in the virtual device 20 while the real device 10 was in the power saving state (hereinafter referred to also as "update data"), in other words, pieces of data to be synchronized because the synchronization has not been performed when the real device 10 returned from the power saving state. The list transmitter 212 transmits the update data list created by the update data list creator 211 to the real device 10. The update data transmitter 213 transmits pieces of real update data to the real device 10.

The storage 23 basically stores various types of information substantially the same as those in the real device 10. The storage 23 further stores pieces of data that have not been synchronized with the real device 10, that is, update data.

The components 21 and 22 of the virtual device 20 are realized by collaboration between the computer mounted on the virtual device 20 and programs that operate on the CPU mounted on the computer. The storage 23 is realized by the HDD mounted on the virtual device 20. Alternatively, a RAM or a cloud storage may be used.

In this exemplary embodiment, the programs may be provided via a communicator or by being stored in a computer readable recording medium such as a CD-ROM or a USB memory. The programs provided from the communicator or the recording medium are installed in the computer and sequentially executed by the CPU of the computer to realize various processes.

As described above, the multifunction peripherals 10 and 20 provide substantially the same services. The synchronization process for synchronizing data between the multifunction peripherals 10 and 20 is started in response to an inquiry sent from the real device 10 to the virtual device 20 at a predetermined timing. Since the real device 10 in a power-off state or in a power saving state of a power saving mode does not make an inquiry, data updated in the virtual device 20 during the power saving state is not synchronized. In the virtual device 20, the data updated while the synchronization is not performed ("update data") is held in the storage 23. At least the update data is managed in association with attribute information to determine data such as an application that may use the update data.

More specifically, the attribute information of the update data includes information indicating whether the update data has urgency of synchronization from the viewpoint of, for example, security, information indicating whether the data is related to the system, information for identifying an application that uses the data, information for identifying a process that uses the data, and information indicating, if the update data is an application, the type of the application.

In this exemplary embodiment, the pieces of update data are roughly classified into two types of data that are first data and second data depending on attributes. The "first data" is update data that may affect execution of processes of one or more users and is designated as the first data by the virtual device 20. The "second data" is update data other than the first data.

In this exemplary embodiment, the first data includes update data related to the system or having urgency of synchronization from the viewpoint of, for example, security. The update data handled as the first data may affect all the users and therefore urgent synchronization is appropriate irrespective of the user of the real device 10. The term "urgent" is not limited to the meaning that immediate synchronization is needed by forcibly terminating the power saving state. This term means that immediate synchronization is appropriate in response to return from the power saving state so as not to cause trouble even if the process to be executed immediately after the return from the power saving state is not identified, in other words, even if any process is executed immediately after the return from the power saving state.

In this exemplary embodiment, an administrator of the virtual device 20 designates all the pieces of data having urgency and data related to the system as the first data. For example, the data related to the system may include update data for changing a screen layout of the operation panel instead of correcting a bug causing an error. Therefore, the administrator may select update data to be included in the urgent data. As in the synchronization process described later, the process may be started earlier after the return from the power saving state as the amount of the first data is smaller. In this exemplary embodiment, the "first data" may be referred to also as "urgent data" for convenience of the description.

Operations of this exemplary embodiment are described.

The real device 10 inquires update from the virtual device 20 in response to return from the power saving state, and performs synchronization by acquiring data updated in the virtual device 20 during the power saving state. Thus, the synchronization process is also started in response to the return from the power saving state.

In this exemplary embodiment, an event that triggers return from the power saving state is referred to as "power saving return type". The "power saving return type" is, for example, regular return from power saving, return by a user's operation, return by a specific user's operation, or return by input of a print job from outside. The power-off state may correspond to the power saving state because the power consumption is reduced. In this exemplary embodiment, however, the power saving return type does not include return from the power-off state because the power-off state does not correspond to the power saving mode that is one operation mode during the power-on state. If the power-off state is included in flowcharts, the process may be executed similarly to the regular process.

The "regular return from power saving" is return from the power saving mode under operation control of the system of the real device 10, for example, the controller 12. The "return by a user's operation" is return from the power saving mode in response to, for example, an operation of a user on the operation panel of the real device 10 in the power saving mode. When the operation panel is operated, it is presumed that any user has started to use the real device 10, but the user and the process to be executed are not identified.

In some types of real device 10, the user may cause a card reader of the real device 10 to read his/her IC card to automatically log into the system and return the real device 10 in the power saving mode from the power saving state. The real device 10 may identify the user by reading the IC card that records personal identification information such as a user ID. Thus, the "return by a specific user's operation" is return from the power saving mode with the user identifiable by, for example, reading the IC card. When the user logs into the system, the user who starts to use the real device 10 is identified, but the process to be executed is not identified.

The "return by input from outside" is return from the power saving mode by a job transmitted via the network from the outside such as a PC of the user, instead of the user's input operation on the operation panel of the real device 10. By analyzing the job, the user who requests execution of a process and the process to be executed are identified.

As described above, information identified at the time of return from the power saving (e.g., user and process) is different depending on the power saving return type. In this exemplary embodiment, priority levels of synchronization of pieces of update data handled as the pieces of second data are determined based on the power saving return type.

Figure 2A:
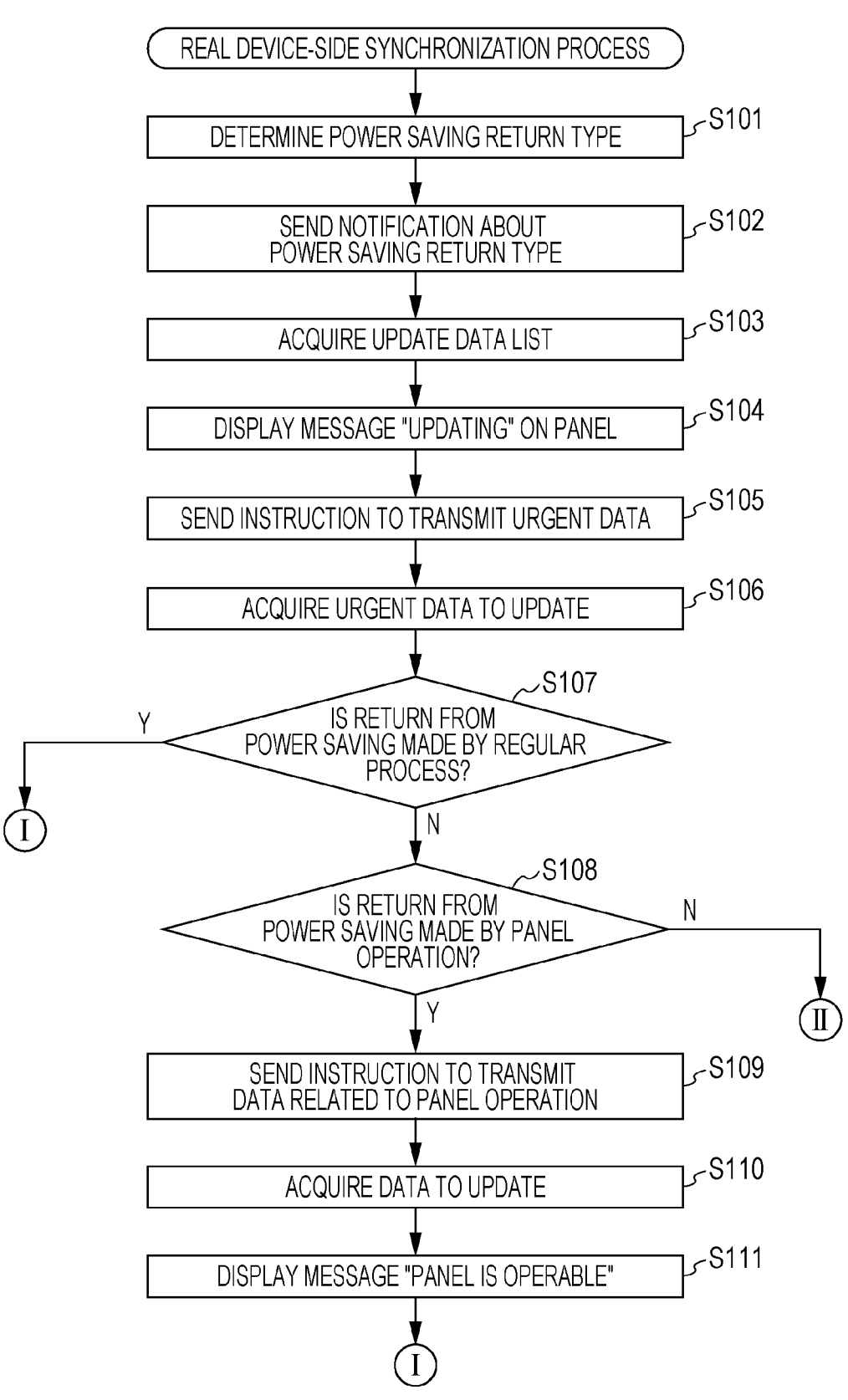
FIG. 2A is a flowchart illustrating a real device-side synchronization process in the first exemplary embodiment.
Figure 2B:
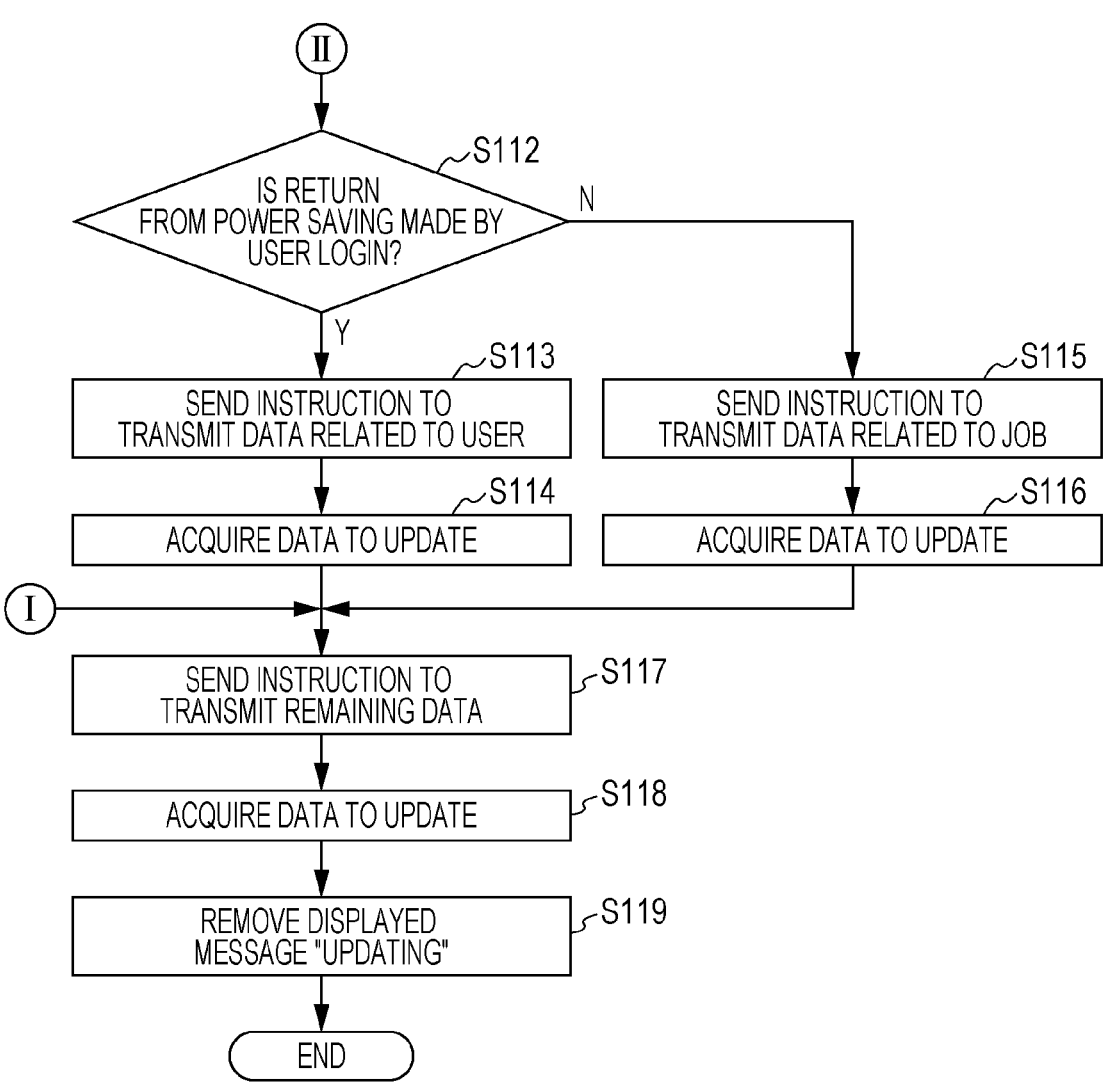
FIG. 2B is a flowchart continued from FIG. 2A.
Figure 3:
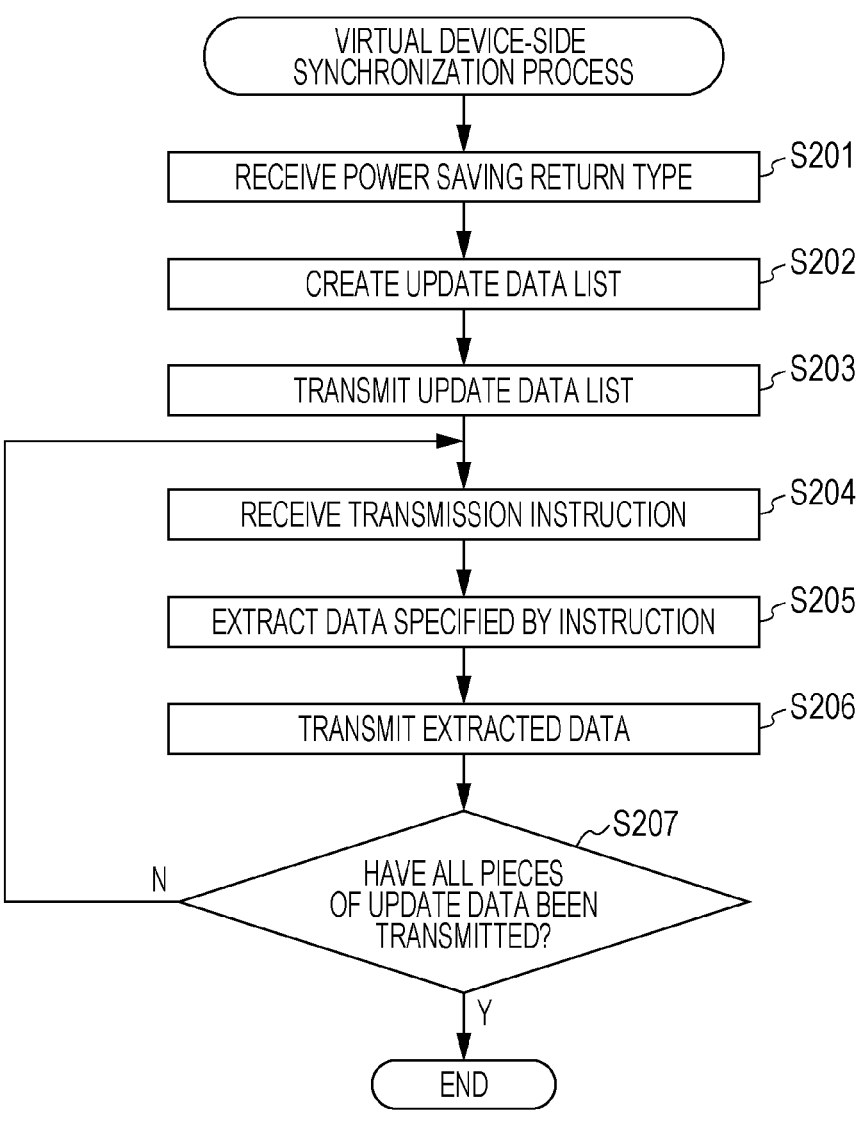
FIG. 3 is a flowchart illustrating a virtual device-side synchronization process in the first exemplary embodiment.

FIGS. 2A and 2B are flowcharts illustrating a synchronization process in the real device 10. FIG. 3 is a flowchart illustrating a synchronization process in the virtual device 20. The synchronization processes in this exemplary embodiment are described with reference to the flowcharts of FIGS. 2A to 3. The synchronization processes in this exemplary embodiment have a feature in that the real device 10 controls transmission of synchronization target data, in particular, determines priority levels of synchronization of pieces of update data included in the pieces of second data.

In FIG. 2A, in response to return from the power saving state, the real device 10 determines an event that has triggered the return from the power saving state, that is, a power saving return type (Step 101). The controller 12 may determine the power saving return type by using an existing function.

The power saving return type notifier 111 of the synchronization processor 11 notifies the virtual device 20 about the determined power saving return type (Step 102). This notification corresponds to the update inquiry to the virtual device 20 in response to the return from the power saving state in the related art. In this exemplary embodiment, the virtual device 20 does not change details of the process depending on the power saving return type. Therefore, a notification about the return from the power saving state and a request for the synchronization process may be sent as in the related-art update inquiry without sending the notification about the power saving return type.

In FIG. 3, when the virtual device 20 receives the notification about the power saving return type from the real device 10 (Step 201), the update data list creator 211 of the synchronization processor 21 refers to the storage 23 to identify pieces of synchronization target data, that is, update data, and create a list of the pieces of update data (Step 202). The list transmitter 212 transmits the created update data list to the real device 10 (Step 203).

The data to be handled in the subsequent processes is the update data. For convenience of the description, the term "data" refers to the update data. In this exemplary embodiment, it is assumed that the update data is present. If no update data is present, the synchronization processor 21 transmits a notification that no update data is present instead of transmitting the update data list. Thus, the synchronization processes between the real device 10 and the virtual device 20 are terminated.

Referring back to FIG. 2A, the synchronization processor 11 acquires the update data list transmitted from the virtual device 20 in response to the notification about the power saving return type (Step 103). Then, data update is started, and therefore the controller 12 causes the operation panel to display a message "updating data" (Step 104). In the display of the message "updating data", the controller 12 may display an expected period for the data update, an expected end time or the remaining period of the data update, an update data count, or any other information indicating the progress and an expected period or time about the completion of the data update while sequentially refreshing them. If the user's panel operation has triggered the return from the power saving, the operation panel may display a message that the operation panel is not currently operable.

Although details are described later, the timings to start synchronization processes are different between the first data and the second data. In this exemplary embodiment, the list of all the pieces of update data is acquired in Step 103, but the first data and the second data may separately be acquired as needed.

The synchronization processor 11 instructs the virtual device 20 to transmit urgent data by transmitting an urgent data transmission request to the virtual device 20 (Step 105).

In FIG. 3, when the transmission instruction is received from the real device 10 (Step 204), the synchronization processor 21 extracts the urgent data from the pieces of update data in response to the transmission instruction (Step 205). The update data transmitter 213 transmits the extracted urgent data to the real device 10 (Step 206). The urgent data may be identified by referring to attribute information associated with each piece of update data. If transmission of all the pieces of update data in the list has not been completed ("N" in Step 207), the synchronization processor 21 proceeds to Step 204 to wait for transmission of the next instruction from the real device 10.

In FIG. 2A, when the urgent data transmitted in response to the transmission instruction is acquired, the synchronization processor 11 performs update with the urgent data (Step 106).

In this exemplary embodiment, the synchronization control is performed to synchronize the urgent data (i.e., first data) with priority among the pieces of update data as described above.

In the above description, the urgent data is identified by the virtual device 20, but may be identified by the real device 10 by adding the attribute information of each piece of update data to the update data list to be transmitted to the real device 10.

The synchronization processor 11 controls the synchronization process to, after the completion of a synchronization process for synchronizing the first data (hereinafter referred to also as "first synchronization process"), start a synchronization process for the second data (hereinafter referred to also as "second synchronization process"). In this exemplary embodiment, details of the second synchronization process, that is, the order of synchronization of the pieces of update data constituting the second data are/is determined based on the power saving return type. Therefore, the synchronization processor 11 checks the power saving return type. If the power saving return type is "regular return from power saving" ("Y" in Step 107), the controller 12 makes the return from the power saving mode. Therefore, the user and the process to be executed are not currently determined, and the process is not always executed. Thus, there is no need to determine the priority levels of synchronization in the second data. In other words, all the pieces of second data may have the same priority level.

The synchronization processor 11 instructs the virtual device 20 to transmit the remaining pieces of update data other than the urgent data by transmitting, to the virtual device 20, a request to transmit the remaining unsynchronized pieces of update data, in this case, all the pieces of second data other than the synchronized first data (Step 117).

In FIG. 3, when the transmission instruction is received from the real device 10 (Step 204), the synchronization processor 21 extracts all the pieces of update data other than the synchronized urgent data in response to the transmission instruction (Step 205). The update data transmitter 213 transmits the extracted pieces of update data to the real device 10 (Step 206). Since all the pieces of update data in the update data list have been transmitted by transmitting the remaining pieces of update data ("Y" in Step 207), the synchronization processor 21 terminates the synchronization process.

In FIG. 2B, when the pieces of update data transmitted in response to the transmission instruction are acquired, the synchronization processor 11 performs update with the pieces of update data (Step 118). The synchronization processor 11 grasps that all the pieces of update data have been acquired in Steps 106 and 118 by referring to the update data list.

As described above, if the power saving return type is "regular return from power saving", the synchronization processor 11 acquires all the pieces of second data as the remaining pieces of update data subsequently to the first data, thereby synchronizing all the pieces of update data. If the second synchronization process is completed and all the pieces of update data are synchronized, the controller 12 removes, from the operation panel, the message "updating data" displayed on the operation panel in Step 104 after the return from the power saving state (Step 119).

In the above description, the second data is identified by the virtual device 20, but may be identified by the real device 10 by adding the attribute information of each piece of update data to the update data list to be transmitted to the real device 10. Alternatively, the update data other than the acquired urgent data may be identified as the second data by referring to the update data list.

If the power saving return type is "return by a user's operation", the user's operation on the operation panel has triggered the return from the power saving mode. In this case ("N" in Step 107, "Y" in Step 108), the user is presumed to be at the installation place of the real device 10 and have operated the operation panel to use the real device 10. That is, the user is presumed to continuously operate the operation panel after the return from the power saving mode. Therefore, the synchronization processor 11 instructs the virtual device 20 to transmit data related to the panel operation by transmitting, to the virtual device 20, a request to transmit the data related to the panel operation (Step 109). The "data related to the panel operation" is data related to the operation panel, such as an application that needs the user's panel operation or data related to the layout of the operation panel. With the panel operation for the return from the power saving mode, the user is not identified because the user has not logged in.

In FIG. 3, when the transmission instruction is received from the real device 10 (Step 204), the synchronization processor 21 extracts the data related to the panel operation from the pieces of second data in response to the transmission instruction (Step 205). The update data transmitter 213 transmits the extracted data related to the panel operation to the real device 10 (Step 206). The data related to the panel operation may be identified by referring to the attribute information associated with each piece of update data. If all the pieces of update data in the list have not been transmitted ("N" in Step 207), the synchronization processor 21 proceeds to Step 204 to wait for transmission of the next instruction from the real device 10.

In FIG. 2A, when the data related to the panel operation transmitted in response to the transmission instruction is acquired, the synchronization processor 11 performs update with the data related to the panel operation (Step 110).

In this exemplary embodiment, the synchronization control is performed to synchronize the data related to the panel operation with priority among the pieces of second data as described above.

When the data related to the panel operation is synchronized, no trouble may occur in the user's operation on the operation panel. Therefore, the controller 12 performs control to receive operations on the operation panel and causes the operation panel to display a message "panel is operable" (Step 111). At this time, the synchronization of all the pieces of update data has not been completed, and therefore the operation panel keeps the message "updating data" displayed in Step 104.

As described above, if the power saving return type is "return by a user's operation", the data related to the panel operation is synchronized with priority among the pieces of second data. The priority levels need not be set for the other remaining pieces of second data, and the synchronization processor 11 instructs the virtual device 20 to transmit the remaining pieces of update data by transmitting, to the virtual device 20, a request to transmit the remaining pieces of unsynchronized data, in this case, the remaining pieces of update data other than the urgent data (i.e., first data) and the data related to the panel operation among the pieces of second data (Step 117).

Since the process of the synchronization processor 21 about the instruction to transmit the remaining pieces of data has already been described, description thereof is omitted. The remaining pieces of data may be identified by comparing the update data list and the transmitted pieces of update data.

In FIG. 2B, when the pieces of update data transmitted in response to the transmission instruction are acquired, the synchronization processor 11 performs update with the pieces of update data (Step 118).

All the pieces of update data are synchronized as described above. When the second synchronization process is completed and all the pieces of update data are synchronized, the controller 12 removes, from the operation panel, the message "updating data" displayed on the operation panel in Step 104 after the return from the power saving state (Step 119).

As described above, if the power saving return type is "return by a user's operation", the synchronization processor 11 synchronizes the data related to the panel operation with priority among the pieces of second data to be synchronized subsequently to the first data. A process requested by the user is started after the data related to the panel operation is synchronized.

It is presumed that the remaining pieces of second data, that is, pieces of data unrelated to the panel operation are not used during the user's panel operation. Therefore, it is presumed that the user's panel operation is not affected even if the pieces of second data unrelated to the panel operation are not synchronized. In this exemplary embodiment, the process to be executed is identified by identifying the power saving return type, and the identified process, in this example, the process to be executed by the user's operation on the operation panel is started after the synchronization is completed for the first data that may affect the execution unless the synchronization is performed and the second data related to the panel operation among the pieces of second data. In other words, the process to be executed by the user's operation on the operation panel may be started without waiting for the completion of the synchronization of the pieces of second data unrelated to the panel operation. The process to be executed by the user's operation and a process for synchronizing the pieces of second data unrelated to the panel operation in the second synchronization process (Steps 117 and 118) may be executed simultaneously in parallel.

In the above description, the data related to the panel operation is identified by the virtual device 20, but may be identified by the real device 10 by adding the attribute information of each piece of update data to the update data list to be transmitted to the real device 10. The remaining pieces of data may be identified by comparing the update data list and the acquired pieces of update data.

If the power saving return type is "return by a specific user's operation", a user's action for reading the IC card has triggered the return from the power saving mode. The user may automatically log into the real device 10 by causing the real device 10 to read the IC card. Accordingly, the real device 10 may identify the login user and predict the user expected to request execution of a process. In this case ("N" in Step 108, "Y" in Step 112), the synchronization processor 11 regards the login user as a specific user, and instructs the virtual device 20 to transmit data related to the user by transmitting, to the virtual device 20, a request to transmit the data related to the user (Step 113). Examples of the "data related to the specific user" include an application in which the user is registered among the applications installed in the multifunction peripherals 10 and 20, data used in the past by the user, data created by the user, and an application that uses the data created by the user. The user is presumed to have logged in to execute any process, but the process to be executed is not identified at this time.

In FIG. 3, when the transmission instruction is received from the real device 10 (Step 204), the synchronization processor 21 extracts the data related to the specific user from the pieces of update data in response to the transmission instruction (Step 205). The update data transmitter 213 transmits the extracted data to the real device 10 (Step 206). The data related to the specific user may be identified by referring to the attribute information associated with each piece of update data, the user information, and the record information. By referring to the record information, data such as an application used in the past by the specific user may be identified. If transmission of all the pieces of update data in the list has not been completed ("N" in Step 207), the synchronization processor 21 proceeds to Step 204 to wait for transmission of the next instruction from the real device 10.

In FIG. 2B, when the data related to the specific user transmitted in response to the transmission instruction is acquired, the synchronization processor 11 performs update with the data related to the specific user (Step 114).

In this exemplary embodiment, the synchronization control is performed to synchronize the data related to the specific user with priority among the pieces of second data as described above.

As described above, if the power saving return type is "return by a specific user's operation", the data related to the specific user is synchronized with priority among the pieces of second data. The priority levels need not be set for the other remaining pieces of second data, and the synchronization processor 11 instructs the virtual device 20 to transmit the remaining pieces of update data by transmitting, to the virtual device 20, a request to transmit the remaining pieces of unsynchronized data, in this case, the remaining pieces of update data other than the urgent data (i.e., first data) and the data related to the specific user among the pieces of second data (Step 117).

Since the process of the synchronization processor 21 about the instruction to transmit the remaining pieces of data has already been described, description thereof is omitted. The remaining pieces of data may be identified by comparing the update data list and the transmitted pieces of update data.

In FIG. 2B, when the pieces of update data transmitted in response to the transmission instruction are acquired, the synchronization processor 11 performs update with the pieces of update data (Step 118).

All the pieces of update data are synchronized as described above. When the second synchronization process is completed and all the pieces of update data are synchronized, the controller 12 removes, from the operation panel, the message "updating data" displayed on the operation panel in Step 104 after the return from the power saving state (Step 119).

As described above, if the power saving return type is "return by a specific user's operation", the synchronization processor 11 synchronizes the data related to the specific user with priority among the pieces of second data to be synchronized subsequently to the first data. A process requested by the login user, that is, the specific user is started after the data related to the specific user is synchronized.

It is presumed that the remaining pieces of second data, that is, pieces of data unrelated to the specific user are not used even if the user subsequently executes the process. Therefore, it is presumed that the execution of the process of the user is not affected even if the pieces of second data unrelated to the specific user are not synchronized. In this exemplary embodiment, the process to be executed is identified by identifying the power saving return type, and the identified process, in this example, the process related to the specific user is started after the synchronization is completed for the first data that may affect the execution unless the synchronization is performed and the second data related to the specific user among the pieces of second data. In other words, the process to be executed by the specific user may be started without waiting for the completion of the synchronization of the pieces of second data unrelated to the specific user. The process to be executed by the specific user and a process for synchronizing the pieces of second data unrelated to the specific user in the second synchronization process (Steps 117 and 118) may be executed simultaneously in parallel.

In the above description, the data related to the specific user is identified by the virtual device 20, but may be identified by the real device 10 by adding the attribute information of each piece of update data to the update data list to be transmitted to the real device 10.

If the power saving return type is "return by input from outside", the return from the power saving mode has been triggered by input of a job specified by a job execution instruction sent by a user to the real device 10 from a device other than the real device 10, such as the user's PC. The real device 10 may identify the user who has sent the execution request and a process to be executed by referring to the job. In this case ("N" in Step 112), the synchronization processor 11 instructs the virtual device 20 to transmit data related to the job by transmitting, to the virtual device 20, a request to transmit the data related to the job (Step 115).

Examples of the "data related to the job" include an application related to printing if the input job is a print job, and an application related to a scanning function and an application related to a mailing function if the input job is a job using a scan-to-mail function.

In FIG. 3, when the transmission instruction is received from the real device 10 (Step 204), the synchronization processor 21 extracts the data related to the job from the pieces of update data in response to the transmission instruction (Step 205). The update data transmitter 213 transmits the extracted data related to the job to the real device 10 (Step 206). The data related to the job may be identified by referring to the attribute information associated with each piece of update data, and the user information. If transmission of all the pieces of update data in the list has not been completed ("N" in Step 207), the synchronization processor 21 proceeds to Step 204 to wait for transmission of the next instruction from the real device 10.

In FIG. 2B, when the data related to the job transmitted in response to the transmission instruction is acquired, the synchronization processor 11 performs update with the data related to the job (Step 116).

In this exemplary embodiment, the synchronization control is performed to synchronize the data related to the job with priority among the pieces of second data as described above.

As described above, if the power saving return type is "return by input from outside", the data related to the job is synchronized with priority among the pieces of second data. The priority levels need not be set for the other remaining pieces of second data, and the synchronization processor 11 instructs the virtual device 20 to transmit the remaining pieces of update data by transmitting, to the virtual device 20, a request to transmit the remaining pieces of unsynchronized data, in this case, the remaining pieces of update data other than the urgent data (i.e., first data) and the data related to the job among the pieces of second data (Step 117).

Since the process of the synchronization processor 21 about the instruction to transmit the remaining pieces of data has already been described, description thereof is omitted. The remaining pieces of data may be identified by comparing the update data list and the transmitted pieces of update data.

In FIG. 2B, when the pieces of update data transmitted in response to the transmission instruction are acquired, the synchronization processor 11 performs update with the pieces of update data (Step 118).

All the pieces of update data are synchronized as described above. When the second synchronization process is completed and all the pieces of update data are synchronized, the controller 12 removes, from the operation panel, the message "updating data" displayed on the operation panel in Step 104 after the return from the power saving state (Step 119).

As described above, if the power saving return type is "return by input from outside", the synchronization processor 11 synchronizes the data related to the job with priority among the pieces of second data to be synchronized subsequently to the first data. The job requested by the user is started after the data related to the job is synchronized.

It is presumed that the remaining pieces of second data, that is, pieces of data unrelated to the job are not used even if the job is executed. Therefore, it is presumed that the execution of the job is not affected even if the pieces of second data unrelated to the job are not synchronized. Thus, the job from the outside is executed early after the real device 10 has returned from the power saving mode and the urgent data and the second data related to the job have been synchronized, without waiting for the completion of the synchronization of the pieces of second data unrelated to the job. The job and a process for synchronizing the pieces of second data unrelated to the job (Steps 117 and 118) may be executed simultaneously in parallel.

In the above description, the data related to the job is identified by the virtual device 20, but may be identified by the real device 10 by adding the attribute information of each piece of update data to the update data list to be transmitted to the real device 10.

During the synchronization process based on the update data list, an event corresponding to the trigger may occur, such as an operation on the operation panel, user login, or job input. If the event has occurred during the first synchronization process and the second synchronization process has not been started, the priority levels of the pieces of second data may be determined based on the event. If the event has occurred during the second synchronization process, the priority levels may be set again based on the event among the pieces of unsynchronized second data.

In this exemplary embodiment described above, the real device 10 in the synchronization process acquires the update data list instead of collectively acquiring all the pieces of synchronization target data in advance. The real device 10 executes the first synchronization process for the first data that may affect execution of processes among the pieces of update data. If execution of a process is requested before completion of the synchronization processes, the real device 10 starts the process after the completion of the first synchronization process without waiting for the completion of the second synchronization process for the pieces of second data other than the first data among the pieces of update data. The pieces of second data may include update data that may affect the execution of the process. Therefore, the real device 10 predicts the process to be requested after the return from the power saving mode based on the power saving return type, and synchronizes, before the start of the process, the second data that may affect the execution of the predicted process among the pieces of second data. That is, the real device 10 synchronizes the update data expected not to affect the execution of the process in parallel or subsequently to the process.

Second Exemplary Embodiment

In the first exemplary embodiment, the real device 10 controls transmission of the synchronization target data based on the power saving return type. This exemplary embodiment has a feature in that the virtual device 20 controls transmission of the synchronization target data, in particular, determines the priority levels of synchronization of the pieces of update data included in the second data.

The overall configuration of the service system and the block configurations of the multifunction peripherals 10 and

20 in this exemplary embodiment may be the same as those in the first exemplary embodiment.

Figure 4:
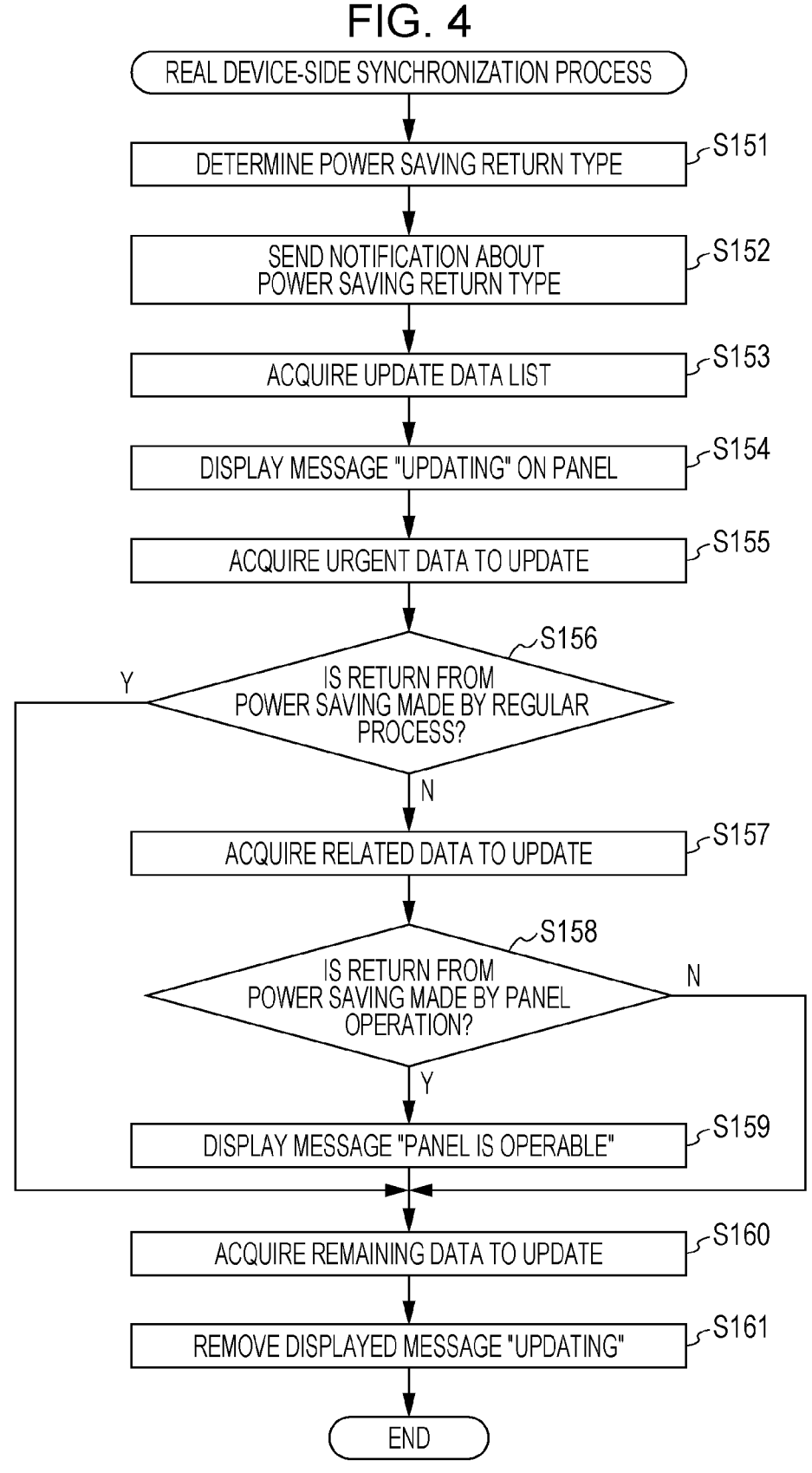
FIG. 4 is a flowchart illustrating a real device-side synchronization process in a second exemplary embodiment.
Figure 5:
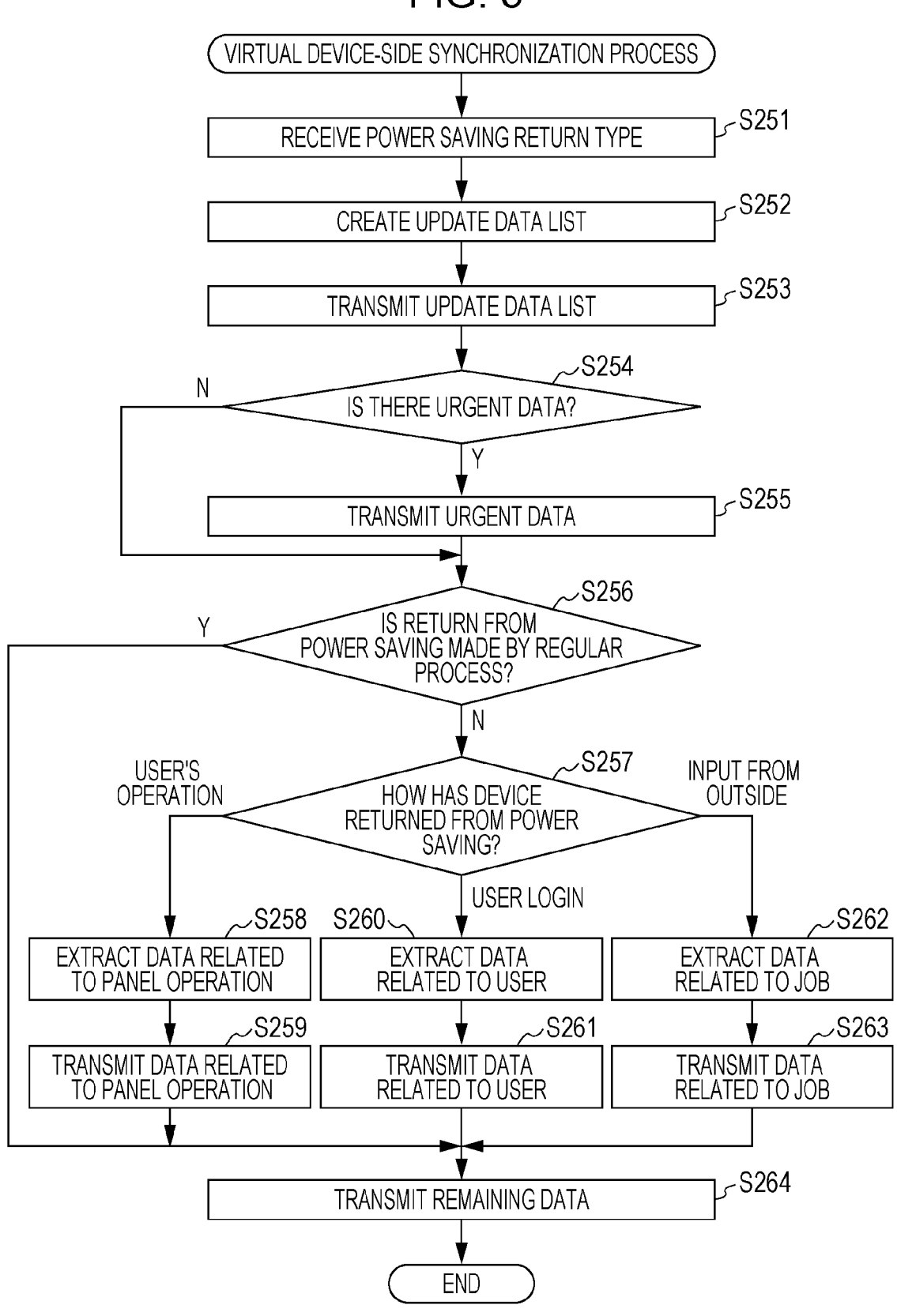
FIG. 5 is a flowchart illustrating a virtual device-side synchronization process in the second exemplary embodiment.

FIG. 4 is a flowchart illustrating a synchronization process in the real device 10. FIG. 5 is a flowchart illustrating a synchronization process in the virtual device 20. The synchronization processes in this exemplary embodiment are described with reference to the flowcharts of FIGS. 4 and 5.

In the real device 10, processes from determination of the power saving return type to display of the message "updating data" (Steps 151 to 154) may be the same as the processes in the first exemplary embodiment (Steps 101 to 104).

In the virtual device 20, processes from reception of the power saving return type to transmission of the update data list (Steps 251 to 253) may be the same as the processes in the first exemplary embodiment (Steps 201 to 203). When the update data list is transmitted, the synchronization processor 21 controls transmission of pieces of update data as follows by referring to the update data list and the power saving return type.

The synchronization processor 21 checks whether urgent data is included in the pieces of update data. If the urgent data is present ("Y" in Step 254), the update data transmitter 213 extracts the urgent data from the update data list, and transmits it to the real device 10 (Step 255). In this exemplary embodiment, the methods for extracting the first data (i.e., urgent data) or the second data from the pieces of update data and extracting data from the pieces of second data based on the power saving return type may be the same as those in the first exemplary embodiment. Therefore, description thereof is omitted.

In FIG. 4, when the urgent data is acquired from the virtual device 20, the synchronization processor 11 performs update with the urgent data (Step 155).

If no urgent data is present ("N" in Step 254), the update data to be transmitted is not present. For the process in Step 155, the real device 10 may be notified that no urgent data is present.

As described in the first exemplary embodiment, the first data having urgency (i.e., urgent data) is synchronized with priority over the second data that does not have urgency in this exemplary embodiment. After the urgent data is synchronized, the second synchronization process is performed to synchronize the second data.

As illustrated in FIG. 5, if the power saving return type is "regular return from power saving" ("Y" in Step 256), the synchronization processor 21 transmits, to the real device 10, the remaining unsynchronized pieces of update data, in this case, all the pieces of second data other than the synchronized first data (Step 264).

If the power saving return type is "return by a user's operation" ("N" in Step 256, "user's operation" in Step 257), the synchronization processor 21 extracts data related to the panel operation from the pieces of second data (Step 258). The update data transmitter 213 transmits the extracted data related to the panel operation to the real device 10 (Step 259). The synchronization processor 21 transmits, to the real device 10, the remaining unsynchronized pieces of data, that is, pieces of update data other than the data related to the panel operation among the pieces of second data (Step 264).

If the power saving return type is "return by a specific user's operation" ("N" in Step 256, "user login" in Step 257), the synchronization processor 21 extracts data related to the login user from the pieces of second data (Step 260). The update data transmitter 213 transmits the extracted data related to the user to the real device 10 (Step 261). The update data transmitter 213 transmits, to the real device 10, the remaining unsynchronized pieces of data, that is, pieces of update data other than the data related to the specific user among the pieces of second data (Step 261).

If the power saving return type is "return by a specific user's operation", the power saving return type notifier 111 sends a notification about personal identification information such as a user ID for identifying the login user.

If the power saving return type is "return by input from outside" ("N" in Step 256, "input from outside" in Step 257), the synchronization processor 21 extracts data related to a job from the pieces of second data (Step 262). The synchronization processor 21 transmits the extracted data related to the job to the real device 10 (Step 263). The synchronization processor 21 transmits, to the real device 10, the remaining unsynchronized pieces of data, that is, pieces of update data other than the data related to the job among the pieces of second data (Step 264).

If the power saving return type is "return by input from outside", the power saving return type notifier 111 sends a notification about personal identification information for identifying a user who has requested execution of the job and about the process to be executed.

In FIG. 4, the synchronization processor 11 checks the power saving return type. If the power saving return type is "regular return from power saving" ("Y" in Step 156), the synchronization processor 11 acquires the remaining pieces of update data transmitted in Step 264, and performs update with the pieces of update data (Step 160). When the second synchronization process is completed and all the pieces of update data are synchronized, the controller 12 removes, from the operation panel, the message "updating data" displayed on the operation panel in Step 154 after the return from the power saving state (Step 161).

If the power saving return type is not "regular return from power saving" ("N" in Step 156), the synchronization processor 11 acquires various types of related data from the virtual device 20, and performs update with the related data (Step 157). By synchronizing the related data, the real device 10 may start the requested process.

If the power saving return type is "return by a user's operation" ("Y" in Step 158), the related data acquired in Step 157 is the data related to the panel operation transmitted in Step 259. When the data related to the panel operation is synchronized, the controller 12 causes the operation panel to display the message "panel is operable" (Step 159). When the remaining pieces of update data are acquired from the virtual device 20, the synchronization processor 11 performs update with the pieces of update data (Step 160). The pieces of update data transmitted in Step 264 other than the data related to the panel operation are acquired in this process. The synchronization processor 11 may check that the remaining pieces of data are present by checking the pieces of update data acquired from the virtual device 20 against the update data list.

If the power saving return type is "return by a specific user's operation" or "return by input from outside" ("N" in Step 158), details of processes may be the same. If the power saving return type is "return by a specific user's operation", the related data acquired in Step 157 is the data related to the specific user transmitted in Step 261. The remaining pieces of data acquired in Step 160 are pieces of second data other than the data related to the specific user among the pieces of second data transmitted in Step 264.

If the power saving return type is "return by input from outside", the related data acquired in Step 157 is the data related to the job transmitted in Step 263. The remaining pieces of data acquired in Step 160 are pieces of second data other than the data related to the job among the pieces of second data transmitted in Step 264.

When the second synchronization process is completed and all the pieces of update data are synchronized as described above, the controller 12 removes, from the operation panel, the message "updating data" displayed on the operation panel in Step 154 after the return from the power saving state (Step 161). The real device 10 may distinguish the acquired update data and the unacquired update data by checking the pieces of update data acquired from the virtual device 20 against the update data list.

In this exemplary embodiment described above, the priority levels are determined with the pieces of second data divided into two groups that are a group of second data that affects the execution of the requested process and a group of second data that does not affect the execution. If the pieces of second data are divided into more than two groups or the number of divided groups changes each time, the number of times of execution of the processes in Steps 157 to 160, in particular, the processes for acquiring the second data may change. Therefore, the update data list is useful to grasp the acquired update data and the unacquired update data.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX ((1)))

An information processing apparatus configured to synchronize held data with an other information processing apparatus, the information processing apparatus comprising:

a processor configured to:

acquire a list of pieces of synchronization target data from the other information processing apparatus in response to return from a power saving state;

control synchronization processes to execute a first synchronization process for synchronizing, among the pieces of synchronization target data, first data expected to affect execution of processes of one or more users and designated by the other information processing apparatus, and then execute a second synchronization process for synchronizing pieces of second data other than the first data; and in response to a request to execute a process before completion of execution of the synchronization processes, start to execute the requested process after completion of execution of the first synchronization process without waiting for completion of execution of the second synchronization process.

(((2)))

The information processing apparatus according to (((1))), wherein the processor is configured to determine priority levels of synchronization of the pieces of second data after the return from the power saving state.

(((3)))

The information processing apparatus according to (((1))) or (((2))), wherein the priority levels of synchronization of the pieces of second data are determined by referring to records of use of the held data.

(((4)))

The information processing apparatus according to (((2))), wherein the priority levels of synchronization of the pieces of second data are determined based on an event that has triggered the return from the power saving state.

(((5)))

The information processing apparatus according to (((1))), wherein the processor is configured to:

if a user who has requested execution of the process is identifiable before the execution of the second synchronization process, synchronize data related to the user with priority among the pieces of second data in the second synchronization process; and start to execute the process requested by the user after the data related to the user is synchronized.

(((6)))

The information processing apparatus according to (((5))), wherein the processor is configured to:

if the process requested by the user is identifiable before the execution of the second synchronization process, synchronize data related to the process with priority among the pieces of second data; and start to execute the process after the data related to the process is synchronized.

(((7)))

The information processing apparatus according to (((1))), wherein the processor is configured to, if an event that has triggered the return from the power saving state is an operation on a user interface, receive an operation via the user interface after the completion of the execution of the first synchronization process after the return from the power saving state.

(((8)))

The information processing apparatus according to (((7))), wherein the processor is configured to cause the user interface to display information indicating that the synchronization processes are being executed until the second synchronization process is completed after the return from the power saving state.

(((9)))

The information processing apparatus according to (((1))), wherein the other information processing apparatus is configured on a cloud.

(((10)))

A program causing a computer to execute a process, the computer being mounted on an information processing apparatus configured to synchronize held data with an other information processing apparatus, the process comprising:

acquiring a list of pieces of synchronization target data from the other information processing apparatus in response to return from a power saving state;

controlling synchronization processes to execute a first synchronization process for synchronizing, among the pieces of synchronization target data, first data expected to affect execution of processes of one or more users and designated by the other information processing apparatus, and then execute a second synchronization process for synchronizing pieces of second data other than the first data; and in response to a request to execute a process before completion of execution of the synchronization processes, starting to execute the requested process after completion of execution of the first synchronization process without waiting for completion of execution of the second synchronization process.

What is claimed is:

1. An information processing apparatus configured to synchronize held data with an other information processing apparatus, the information processing apparatus comprising:

a processor configured to:

acquire a list of pieces of synchronization target data from the other information processing apparatus in response to return from a power saving state;

control synchronization processes to execute a first synchronization process for synchronizing, among the pieces of synchronization target data, first data expected to affect execution of processes of one or more users and designated by the other information processing apparatus, and then execute a second synchronization process for synchronizing pieces of second data other than the first data; and in response to a request to execute a process before completion of execution of the synchronization processes, start to execute the requested process after completion of execution of the first synchronization process without waiting for completion of execution of the second synchronization process, wherein the other information processing apparatus creates the list of synchronization target data and designates the first data within the list prior to commencement of synchronization, the information-processing executing the first synchronization process according to the designation.

2. The information processing apparatus according to claim 1, wherein the processor is configured to determine priority levels of synchronization of the pieces of second data after the return from the power saving state.

3. The information processing apparatus according to claim 2, wherein the priority levels of synchronization of the pieces of second data are determined by referring to records of use of the held data.

4. The information processing apparatus according to claim 2, wherein the priority levels of synchronization of the pieces of second data are determined based on an event that has triggered the return from the power saving state.

5. The information processing apparatus according to claim 1, wherein priority levels of synchronization of the pieces of second data are determined by referring to records of use of the held data.

6. The information processing apparatus according to claim 1, wherein the processor is configured to:

if a user who has requested execution of the process is identifiable before the execution of the second synchronization process, synchronize data related to the user with priority among the pieces of second data in the second synchronization process; and start to execute the process requested by the user after the data related to the user is synchronized.

7. The information processing apparatus according to claim 6, wherein the processor is configured to:

if the process requested by the user is identifiable before the execution of the second synchronization process, synchronize data related to the process with priority among the pieces of second data; and start to execute the process after the data related to the process is synchronized.

8. The information processing apparatus according to claim 1, wherein the processor is configured to, if an event that has triggered the return from the power saving state is an operation on a user interface, receive an operation via the user interface after the completion of the execution of the first synchronization process after the return from the power saving state.

9. The information processing apparatus according to claim 8, wherein the processor is configured to cause the user interface to display information indicating that the synchronization processes are being executed until the second synchronization process is completed after the return from the power saving state.

10. The information processing apparatus according to claim 1, wherein the other information processing apparatus is configured on a cloud.

11. A non-transitory computer readable medium storing a program causing a computer to execute a process, the computer being mounted on an information processing apparatus configured to synchronize held data with an other information processing apparatus, the process comprising:

acquiring a list of pieces of synchronization target data from the other information processing apparatus in response to return from a power saving state;

controlling synchronization processes to execute a first synchronization process for synchronizing, among the pieces of synchronization target data, first data expected to affect execution of processes of one or more users and designated by the other information processing apparatus, and then execute a second synchronization process for synchronizing pieces of second data other than the first data; and in response to a request to execute a process before completion of execution of the synchronization processes, starting to execute the requested process after completion of execution of the first synchronization process without waiting for completion of execution of the second synchronization process, wherein the other information-processing apparatus creates the list of synchronization target data and designates the first data within the list prior to commencement of synchronization, the information processing apparatus executing the first synchronization process according to the designation.

12. An information processing method to be performed by a computer mounted on an information processing apparatus configured to synchronize held data with an other information processing apparatus, the information processing method comprising:

acquiring a list of pieces of synchronization target data from the other information processing apparatus in response to return from a power saving state;

controlling synchronization processes to execute a first synchronization process for synchronizing, among the pieces of synchronization target data, first data expected to affect execution of processes of one or more users and designated by the other information processing apparatus, and then execute a second synchronization process for synchronizing pieces of second data other than the first data; and in response to a request to execute a process before completion of execution of the synchronization processes, starting to execute the requested process after completion of execution of the first synchronization process without waiting for completion of execution of the second synchronization process, wherein the other information processing apparatus creates the list of synchronization target data and designates the first data within the list prior to commencement of synchronization, the information processing apparatus executing the first synchronization process according to the designation.

* * * * *